US006950501B1

(12) United States Patent
Chaturvedi et al.

(10) Patent No.: US 6,950,501 B1
(45) Date of Patent: *Sep. 27, 2005

(54) INTERNET-BASED MESSAGE TRANSLATION FOR THE HEARING AND SPEECH IMPAIRED

(75) Inventors: Pawan Chaturvedi, Overland Park, KS (US); Andrew McCullough, Lenexa, KS (US); Paul W. Ludwick, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1114 days.

This patent is subject to a terminal disclaimer.

(21) Appl. No.: 09/723,790

(22) Filed: Nov. 28, 2000

(51) Int. Cl.[7] .............................................. H04M 11/00
(52) U.S. Cl. ..................................... 379/52; 379/88.12
(58) Field of Search ............................... 379/52, 88.12, 379/90.01, 93.15, 93.17, 93.18, 93.21, 93.24, 379/93.23, 93.35; 370/352

(56) References Cited

U.S. PATENT DOCUMENTS

| 5,809,112 A | * | 9/1998 | Ryan ............................. 379/52 |
| 6,421,425 B1 | * | 7/2002 | Bossi et al. .................... 379/52 |
| 6,546,082 B1 | * | 4/2003 | Alcendor et al. .............. 379/52 |

* cited by examiner

Primary Examiner—Wing Chan

(57) ABSTRACT

A system and a method for providing Internet-based telephone call message translation for translating messages between parties of a telephone call from text to speech and from speech to text, as required. A server having communication capability over an Internet Protocol connection is provided. At least one message translator having communication capability over an Internet Protocol connection is also provided. A communication link through the server is provided between at least a first party of a number of parties of a telephone call and the message translator via an Internet Protocol connection.

24 Claims, 1 Drawing Sheet

INTERNET-BASED MESSAGE TRANSLATION FOR THE HEARING AND SPEECH IMPAIRED

BACKGROUND OF THE INVENTION

The present invention generally relates to call center telecommunications services. Yet more particularly, the present invention relates to a system and a method for providing Internet-based telephone call message translation for the hearing and speech impaired.

Title IV of the Americans with Disabilities Act of 1990 requires the Federal Communications Commission (FCC) to ensure that telecommunications services are provided to the hearing and speech impaired. In furtherance of this requirement, telecommunications service providers currently provide Telecommunications Relay Services (TRS), or relay centers, as a functional equivalent of telecommunication services for the hearing and speech impaired. Relay centers have been used to provide telecommunications access to hearing and speech impaired people on a nationwide basis since 1983.

Relay centers operate in the following manner. A calling party for this system may be a hearing- or speech-impaired person or a non-impaired person wishing to talk to the hearing- or speech-impaired person.

In a case where the calling party is a hearing- or speech-impaired person, the calling party uses a Telecommunication Device for the Deaf (TDD), such as a Teletypewriter (TTY), for transmitting and receiving typed messages during a call. The calling party places a call to a relay center by dialing a local toll free telephone number. The call is received in the relay center and directed to via a switching system to a communication assistant terminal in the relay center. The call is a modem connection between the calling party and the communication assistant terminal. The calling party then types a telephone number of a non-impaired person that the calling party desires to call. The communication assistant then places a call to the non-impaired person at the desired telephone number. When the call is established with the non-impaired party, the communication assistant acts to relay the call between the calling party and the called party. The calling party types in messages which are read by the communication assistant, who then speaks the messages to the called party. Accordingly, the called party speaks messages to the communication assistant, who in turn types in the called party's messages to be read by the calling party. This operation is performed in an opposite manner when a non-impaired person calls a hearing- or speech-impaired person.

In a conventional relay center, the switching system is connected to a modem in each of the communication assistant terminals and to a call controller. One type of switching system typically used in a call center is a Rockwell Galaxy ACD switch. The call controller is a system having a processing unit and associated memory.

The call controller determines which communication assistant terminal is available to handle a call. When the switching system receives a request for a communication assistant, the switching system transmits a request to the call controller for an available terminal. The call controller responds to the switching system by transmitting an identity of an available communication assistant terminal. The switching system then extends the call to the identified communication assistant terminal.

Each communication assistant terminal includes a computer system that can convert signals received via modem into a text message that is displayed upon a screen. Each terminal also has a telephone station connected to the switching system to receive and to place voice telephonic calls. The communication assistant can enter text into the computer system via a keyboard. The computer system converts the entered text into text messages transmitted to a calling party over the connection established by the modem. The computer is also connected to a network. When a call is completed to a terminal, a Call Detail Record (CDR) is generated by the computer system. The call detail record includes information pertaining to the length of the call. The CDR is then stored by the computer system.

A billing system is connected to each terminal via a network. Periodically, each computer system transmits stored CDRs to the billing system for processing. The billing system then uses the CDRs to generate billing.

Currently, a hearing- or speech-impaired person is limited to making and receiving calls through a TDD access device, which is fixed to its location. While some public telephones, such as those found in airports, are equipped with TDD capabilities, a hearing- or speech-impaired person is generally limited to calling from a TDD device located in their home. In addition, some telephone services available to non-impaired users, such as digital cellular and mobile phone service, are not currently available to hearing- and speech-impaired users. Thus, hearing- and speech-impaired people are greatly restricted in their mobility and by their dependence on TDD devices.

Further, current relay centers provide only a limited number of features. These features are generally restricted to those identified above. A hearing- or speech-impaired person cannot currently actively participate in a conference call or have a multi-party phone conversation. One reason for these limitations is that TDD uses a half-duplex protocol. Even for a person-to-person conversation, the half-duplex protocol limits the interaction between the callers, as one party cannot interrupt or interject when the other party is speaking/typing.

There is also a high cost associated with setting-up and maintaining a relay center. Relay centers comprise high cost equipment and overhead, such as switching centers and a large staff of message translators.

Accordingly, there is a need to provide a hearing- or speech-impaired person with more flexible access to telecommunications service and, thus, eliminate the hearing impaired person's dependency on a TDD device. There is a further need to provide a hearing- or speech-impaired person with access to conference calls and multi-party calls.

SUMMARY OF THE INVENTION

It is therefore an object of the present invention to provide a system and a method for providing Internet-based telephone call message translation that 1) eliminates a user's dependence on a TDD device, 2) provides greater mobility for the user, 3) eliminates the relay center, 4) provides for greater functionality than current relay centers.

The present disclosure provides one or more embodiments directed to improvements in telephone call message translation for hearing- and speech-impaired persons. These improvements can be provided in a single all-encompassing unit or practiced separately.

To this end, in one embodiment, there is provided a method for providing Internet-based telephone call message translation for translating messages between parties of a telephone call from text to speech and from speech to text, as required. A server having communication capability over an Internet Protocol connection is provided. At least one message translator having communication capability over an Internet Protocol connection is provided. A communication link through the server is provided between at least a first party of a number of parties of a telephone call and the message translator via an Internet Protocol connection. Further, a communication link is provided between at least a second party of the number of parties of the telephone call and the message translator via, for example, a dial-up connection. As a result, the present invention provides a method for providing telephone call message translation that does not require the use of a TDD device. A hearing- or speech-impaired person can take part in a telephone call from any location where Internet access in available through a terminal device. The present method also eliminates the use of a relay center.

In another embodiment, the communication link between at least the first party of the telephone call and the message translator is provided by providing an Internet Protocol connection capable communication device to the first party of the telephone call. An Internet Protocol connection is established from the first party of the telephone call to the server. Through a call switching device at the server, the Internet Protocol connection is directed from the first party of the telephone call to an available message translator to complete the communication link.

In a further embodiment, the communication link between at least the second party of the number of parties of the telephone call and the message translator is provided by identifying to the message translator a telephone number of the second party to be called. The message translator effects a dial out to the second party at the identified telephone number and establishes a dial-up connection to complete the communication link.

In another embodiment, the communication link between at least the second party of the number of parties of the telephone call and the message translator is provided by dialing out from the second party to the server and establishing a communications connection between the second party and the server. Through a switching device at the server, the communications connection is directed to an available message translator via an Internet-based connection to complete the communication link.

In yet another embodiment, wherein the communication link between at least the first party of the telephone call and the message translator is provided by providing a terminal device having communication capability to the first party of the telephone call. The message translator dials out to the terminal device of the first party. A plain-text connection is thus established between the message translator and the terminal device to complete the communication link.

In another embodiment, the communication link between at least the first party of the telephone call and the message translator is provided by providing an Internet Protocol or network connection capable communication device to the first party of the telephone call. The message translator establishes an Internet Protocol connection to the first party of the telephone call via the server to complete the communication link.

In another embodiment, there is provided a system for providing Internet-based telephone call message translation for translating messages between parties of a telephone call from text to speech and from speech to text, as required. The system comprises a message translator for translating messages between a number of parties of a telephone call from text to speech and from speech to text, as required, the message translator having communication capability over an Internet Protocol connection. At least one terminal device having communication capability over an Internet Protocol connection is provided for use by at least a first party of the telephone call. Also, a server having communication capability over an Internet Protocol connection is provided for establishing an Internet Protocol connection to the terminal device and for establishing an Internet Protocol connection to the message translator.

The server can comprise a switching device for directing an incoming call to an available message translator. The server can also comprise a web server for establishing the Internet Protocol connections to the terminal device and to the message translator and a message server for administering communication of messages between the parties to a call and the message translator.

The message translator can comprise at least one of a human communications assistant and an automated communications assistant.

In another embodiment, there is provided a method for providing call center service, the method comprising the step of establishing a communication link between at least a first party and a call center via Internet Protocol. A communication link can also be established between at least a second party and the call center. A server having communication capability over an Internet Protocol and/or at least one call center operator having communication capability over Internet Protocol can also be provided. A communication link is provided between the server and at least a first party and the call center operator via Internet Protocol. A communication link between the call center operator and a second party can also be provided.

In another embodiment, there is provided a system for providing call center service. The system comprises a call center operator for providing services to at least a first party, the call center operator having communication capability over Internet Protocol. At least one terminal device having communication capability over Internet Protocol can be provided for use by at least the first party. Also, a server having communication capability over Internet Protocol can be provided for establishing an Internet Protocol connection to a terminal device and for establishing an Internet Protocol connection to the call center operator.

These and other features of the present invention will become clearer with reference to the following detailed description of the presently preferred embodiments and accompanying drawings.

DESCRIPTION OF THE DRAWINGS

The present invention can be better understood with reference to the following figures. The components in the figures are not necessarily to scale, emphasis instead being placed upon illustrating the principals of the invention. Moreover, in the figures, like reference numerals designate corresponding parts throughout the different views.

DETAILED DESCRIPTION OF THE PRESENTLY PREFERRED EMBODIMENTS

Figure 1:
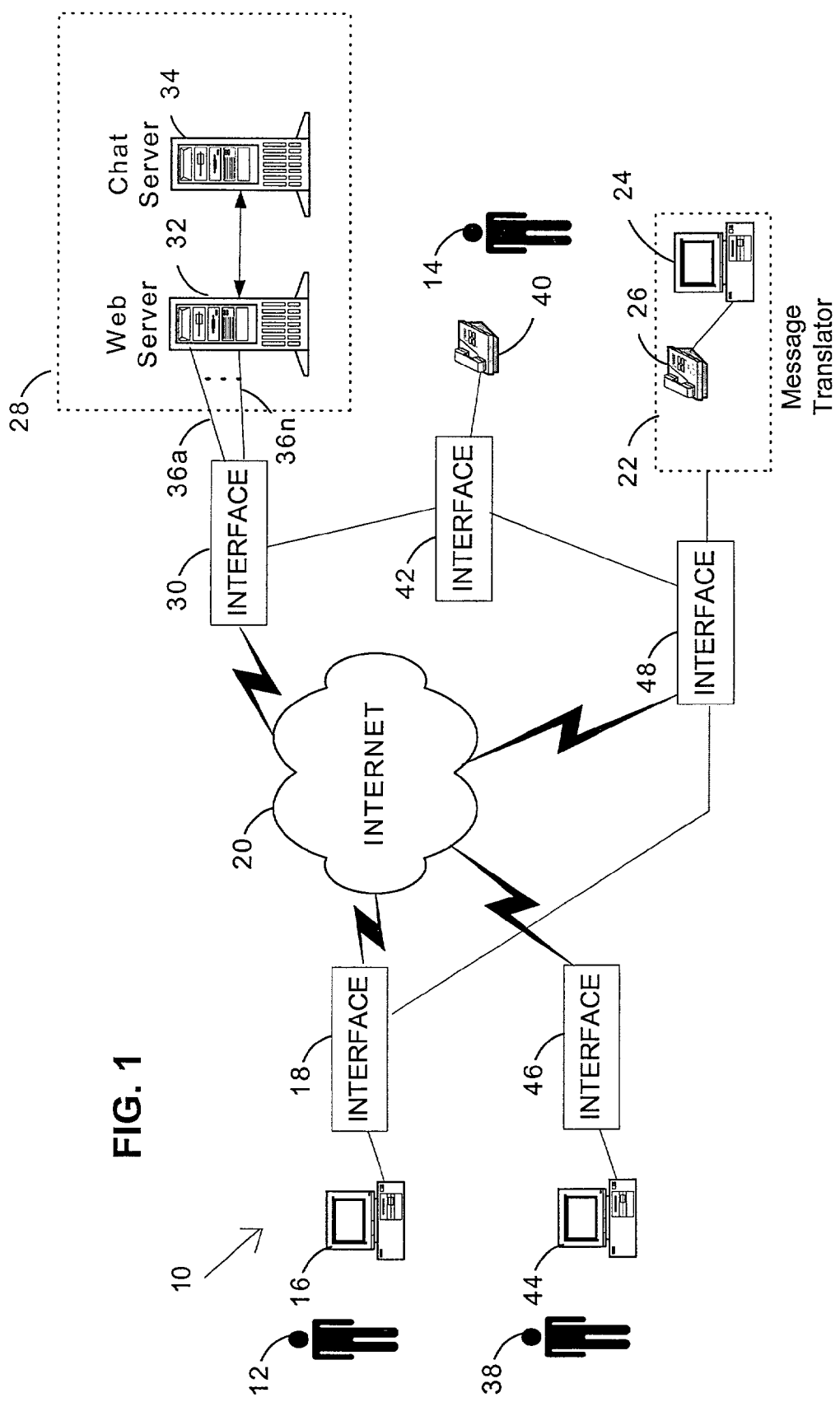
FIG. 1 is a block diagram of a system for providing message translation during a telephone call that operates in accordance with the present invention.

As discussed above, there is provided a system and a method for providing telephone call message translation for the hearing and speech impaired via an Internet-based message translator.

In FIG. 1, there is illustrated a system 10 for providing message translation during a telephone call between a hearing- or speech-impaired person 12 and a non-impaired person 14 that embodies the principles of the present invention. As illustrated, the hearing- or speech-impaired person 12 has a terminal device 16 which is connectable via a communication line interface 18 to the Internet 20. The terminal device 16 is preferably a personal computer having a keyboard for text message entry, a display for displaying messages, and software for Internet access and message transfer. However, the terminal device 16 can be any device that permits communication over an Internet Protocol connection. The terminal device 16, can be, for example, a cellular telephone, a mobile telephone, or a personal data assistant. The communication line interface 18 can be of any type that permits Internet access, such as, an analog connection (such as a POTS connection) or a digital network connection (such as a LAN/WAN connection).

In order to meet the telecommunications requirements of the hearing- or speech-impaired person 12, at least one message translator 22 is provided by a telecommunications service provider. The message translator 22 translates messages between parties of a telephone call from text to speech and from speech to text, as required. The message translator 22 can be either a human communication assistant or an automated communication assistant. In the case of the message translator 22 being a human communication assistant, the message translator 22 has a message translator terminal 24 for sending/receiving text messages to/from the hearing- or speech-impaired person 12. The message translator terminal 24 is connected to the Internet 20 via a communication line interface 48. The message translator 22 also has a message translator telephone 26 for verbally communicating with the non-impaired person 14. The communication line interface 48 at the message translator 22 can be of a type that permits any of an analog connection (such as a POTS connection), a digital connection, or a LAN/WAN connection.

In the case of the message translator 24 being an automated communication assistant, the message translator 22 can merely comprise one or more hardware and/or software devices (not shown) having message translation capability and communication capability. This automated message translator 22 can reside locally at the server 28 or remotely as, for example, a distributed system. The automated message translator 22 performs the same functional operations as a human message translator 22.

Currently, telecommunications service providers perform message translation through relay centers. Telephone calls enter and leave the relay center via a POTS line connected to a switching device in the relay center. The switching device is in turn connected to a number of message translators. The switching device routes incoming calls to available message translator and routes outgoing calls from the message translators to the POTS line. The switching device can comprise, for example, an Automated Call Distributor (ACD), which has known features for billing and performance related tasks that are legally mandated. Alternatively, the switching device can comprise other types of switching devices. As discussed above, relay centers are costly to implement and to maintain.

The present invention overcomes these known limitations by eliminating the relay center and providing an Internet-based server 28 to administer telephone calls between the hearing- or speech-impaired person 12 and the message translator 22. The server 28 is connected to the Internet 20 through a communication line interface 30. The communication line interface 30 can be of any type that permits an analog connection, a digital connection, and/or a LAN/WAN connection to the Internet 20. The server 28 can either be located at a same location as the message translator 22 or at a different location.

The server 28 comprises a web server 32 for administering telephone calls to/from the Internet 20 through the communication line interface 30 and a message server 34 for administering message sessions between the parties of the telephone call and the message translator 22. Multiple communication line connections 36a . . . 36n can be supported by a single web server 32. The server 28 accordingly provides a bridge between the telephone call parties and the message translator 22 via the Internet 20. A telecommunications service provider can furnish either a single server 28 for serving callers from all states or multiple servers 28, for example one in each state.

The web server 32 administers a web site. The web site has a display interface for providing an interactive session between the hearing- or speech-impaired person 12 and the message translator 22. Additional telephone call parties, such as a secondary participant 38 and/or the non-impaired person 14, can also participate in interactive sessions via the display interface. Through display interface prompts, the hearing- or speech-impaired person 12 can, for example, initiate a telephone call to the message translator 22, observe a visual indication that there is an incoming call, enter a destination telephone number of the non-impaired person 14 to be called, enter text messages during the telephone call, and view translated text messages from the message translator 22.

The non-impaired person 14 has a telephonic device 40 which is connectable to a communication line interface 42. The telephonic device 40 can be any device that permits communication through a communication line interface 42. The telephonic device 44 can be, for example, a standard telephone, a cellular telephone, or a mobile telephone.

Similar to the hearing-or speech-impaired person 12, the secondary participant 38 has a secondary participant terminal device 44 which is connectable via a communication line connection 46 to the Internet 20. The secondary participant terminal device 44 is preferably a personal computer having a keyboard for text message entry, a display for displaying messages, and software for Internet access and message transfer. However, the secondary participant terminal device 44 can be any device that permits communication over an Internet Protocol connection. The secondary participant terminal device 44, can be, for example, a cellular telephone, a mobile telephone, or a personal data assistant.

Currently, a hearing- or speech-impaired person must communicate with a relay center through a TDD device over a POTS connection. Since TDD devices can only be used at a fixed location and are limited in number, the hearing- or speech-impaired person is greatly restricted in their mobility and by their dependence on TDD devices. The present system 10 inventively overcomes this known disadvantage by providing an Internet-based message translator 22 which the hearing- or speech-impaired person 12 can access through a terminal device 16 that has Internet connection capability. Thus, the present system 10 allows a hearing- or speech-impaired person 12 to communicate with a message translator 22 from any location where Internet access is available and, further, eliminates the need to use either a TDD device or a relay center.

When a hearing- or speech-impaired person 12 desires to place a telephone call to a non-impaired person 14, first the hearing- or speech-impaired person 12 uses the terminal device 16 to establish a connection over the Internet 20 to the web site on the server 28. In order to establish this connection, the hearing- or speech-impaired person 12 will effect a connection between the terminal device 16 and the Internet 20 via the communication line interface 18 and through their Internet service provider. Then, the hearing- or speech-impaired person 12 accesses the web site on the server 28 by entering an appropriate URL. The server 28 is continuously connected to the Internet 20 through its communication line interface 30 and available for accessing. The web server 32 of the server 28 administers such connections.

Once the hearing- or speech-impaired person 12 has established a connection to the web site on the server 28, the hearing- or speech-impaired person 12 uses the display interface of the web site to establish an interactive session with a message translator 22. To do this, the hearing- or speech-impaired person 12 indicates through the display interface that they desire to initiate such an interactive session. The message server 34 accordingly transmits this indication to an available message translator 22 who has also established a connection with the server 28 via the Internet 20. If the message translator 22 is a human communication assistant, they will observe that the request to initiate an interactive session on their message translator terminal 26. At this point, a communications link is established between the hearing- or speech-impaired person 12 and the message translator 22 via the Internet 20, thus enabling the interactive session during which text messages are communicated.

The hearing- or speech-impaired person 12 then identifies to the message translator 22 a telephone number of the non-impaired person 14 that they desire to call. The message translator 22 accordingly places a telephone call to that non-impaired person 14 through the message translator telephone 26. The telephone call routes from the message translator telephone 26 through the communication line interface 48 and is picked up at the telephonic device 40 through the communication line interface 42. At this point, a communication link is established between the non-impaired person 14 and the message translator 22, through which communication link voice messages are communicated.

Telephone call message translation can then take place through the message translator 22. Text messages from the hearing- or speech-impaired person 12 that are directed to the non-impaired person 14 are displayed on the message translator terminal 24. The message translator 22 reads the text messages aloud into message translator telephone 26 for the non-impaired person 14. Also, voice messages from the non-impaired person 14 that are directed to the hearing- or speech-impaired person 12 are heard by the message translator 22 through the message translator telephone 26. The message translator 22 types the voice message into a text message form on the message translator terminal 24, which message is communicated to the hearing- or speech-impaired person's 12 terminal device 16.

When a non-impaired person 14 desires to place a telephone call to a hearing- or speech-impaired person 12, first the non-impaired person 14 uses the telephonic device 40 to establish a communication link with the server 28. The telephonic device 40 is used to place a telephone call to the server 28 through the communication line interfaces 42. The telephone call is picked up by the server 28 through the communication line interface 30. This connection between the telephonic device 40 and the server 28 can be an analog or a digital connection.

Switching software within the server 28 then routes the connection to an available message translator 22. If the message translator 22 is a human communication assistant, they will observe that the connection has been made on their message translator terminal 24. At this point, a communication link is established between the non-impaired person 14 and the message translator 22, through which communication link voice messages are communicated.

The non-impaired person 14 then identifies to the message translator 22 a telephone number of the hearing- or speech-impaired person 12 that they desire to call. There are several options available for establishing a communication link between the message translator 24 and the hearing- or speech-impaired person 12.

According to a first option, the message translator 24 directly calls the hearing- or speech-impaired person's 12 terminal device 16, which is connected to the communication line interface 18 but not to the Internet 20. This option requires that the terminal device 16 has a remote dialing/text message interaction software, such that the hearing- or speech-impaired person 12 is provided visual notification of an incoming call. The software enables the computer to accept the incoming call and permits the hearing- or speech-impaired person 12 to have an interactive session with the message translator 22.

According to a second option, the message translator 22 exchanges real-time text messages with the hearing- or speech-impaired person's 12 terminal device 16, which is connected to the Internet 20. An email or some other network address may be substituted for the hearing- or speech-impaired person's telephone number.

According to a third option, the message translator 22 establishes a connection to the hearing- or speech-impaired person's 12 terminal device 16 via the Internet 20. This option requires that the terminal device 16 already has an Internet 20 connection established in order to receive the incoming call from the message translator 22.

After the communication link is established between the message translator 22 and the hearing- or speech-impaired person 12, telephone call message translation can then take place through the message translator 22.

Thus, the present invention eliminates the geographical constraints associated with current message translation methods and TDD devices by providing a system and method for providing telephone call message translation via Internet-based telephone call message translation wherein a hearing- or speech-impaired person 12 can conduct a telephone call from any location where Internet 20 access is available through a terminal device 16.

Further, current relay centers provide a limited number of features, such as message translation for only two party telephone calls. A hearing- or speech-impaired person cannot currently actively participate in a conference call or have a multi-party telephone conversation. One reason for these limitations is that TDD devices use a half-duplex protocol. Even for a person-to-person conversation, the half duplex protocol limits the interaction between the callers, as one party cannot interrupt or interject when the other party is speaking/typing (i.e. via text or voice as relayed by a communication assistant).

The present invention overcomes these limitations by eliminating the requirement for a relay center. Further, terminal device 16 supports the full-duplex protocol as well as Internet protocol and/or network connections. Thus, the present invention permits a hearing- or speech-impaired person 12 to take part in a conference call or multi-party telephone conversation.

During a conference call or multi-party call, the message translator 22 can call a conference bridge (not shown) via a communication line interface (not shown) on behalf of the hearing- or speech-impaired person 12. A single message translator 22 can provide simultaneous message translation for multiple hearing- or speech-impaired people 12. Parties are identified on the terminal device 16 and on the message translator terminal 26 by using a protocol, such as a party's name.

The foregoing provides a system and a method for providing Internet-based telephone call message translation that 1) eliminates a user's dependence on a TDD device, 2) provides greater mobility for the user, 3) eliminates the relay center, 4) provides for greater functionality than current relay centers.

The foregoing system and method can also be applied to other applications, such as to call centers for other applications. According to the present invention, people conduct interactive sessions with any type of call center over the Internet Protocol. For example, the message translator 22 can provide a service, such as, information reporting. A person can conduct the interactive session with a call center via, for example, a web page, web-voice over Internet Protocol, or voice to voice through an Internet Protocol capable device.

Further, the foregoing can also be applied to any other network-based or communications protocol.

As is apparent from the foregoing specification, the present invention is susceptible to being embodied with various alterations and modifications which may differ particularly from those that have been described in the preceding specification and description. It should be understood that it is desired to embody within the scope of the patent warranted herein all such modifications as reasonably and properly come within the scope of the presently defined contribution to the art.

We claim as our invention:

1. A method for providing Internet-based telephone call message translation for translating messages between parties of a telephone call, the method comprising the steps of:
   providing a server having communication capability over an Internet Protocol connection;
   providing at least one message translator having communication capability over an Internet Protocol connection;
   providing a full-duplex text communication link through the server between at least a first party of a number of parties of a telephone call and the message translator via an Internet Protocol connection; and
   providing a communication link between a conference bridge and the message translator, thereby allowing the first party to participate in a conference call via the full-duplex text communication link.

2. The method for providing Internet-based telephone call message translation as claimed in claim 1, further comprising the step of:
   providing a voice communication link between at least a second party of the number of parties of the telephone call and the message translator.

3. The method for providing Internet-based telephone call message translation as claimed in claim 1, wherein the full-duplex text communication link between at least the first party of the telephone call and the message translator is provided by:
   providing an Internet Protocol connection capable communication device to the first party of the telephone call;
   establishing a full-duplex text Internet Protocol connection from the first party of the telephone call to the server; and
   through a call switching device at the server, directing the full-duplex text Internet Protocol connection from the first party of the telephone call to an available message translator to complete the full-duplex text communication link.

4. The method for providing Internet-based telephone call message translation as claimed in claim 2, wherein the voice communication link between at least the second party of the number of parties of the telephone call and the message translator is provided by:
   identifying to the message translator a telephone number of the second party to be called; and
   the message translator effecting a dial out to the second party at the identified telephone number and establishing a dial-up connection to complete the voice communication link.

5. The method for providing Internet-based telephone call message translation as claimed in claim 2, wherein the voice communication link between at least the second party of the number of parties of the telephone call and the message translator is provided by:
   dialing out from the second party to the server and establishing a voice communications connection between the second party and the server; and
   through a switching device at the server, directing the voice communications connection to an available message translator via an Internet-based connection to complete the voice communication link.

6. The method for providing Internet-based telephone call message translation as claimed in claim 1, wherein the full-duplex text communication link between at least the first party of the telephone call and the message translator is provided by:
   providing a terminal device having communication capability to the first party of the telephone call;
   the message translator dialing out to the terminal device of the first party; and
   establishing a full-duplex, plain-text connection between the message translator and the terminal device to complete the full-duplex text communication link.

7. The method for providing Internet-based telephone call message translation as claimed in claim 1, wherein the full-duplex text communication link between at least the first party of the telephone call and the message translator is provided by:
   providing an Internet Protocol or network connection capable communication device to the first party of the telephone call; and
   the message translator establishing a full-duplex text Internet Protocol connection to the first party of the telephone call via the server to complete the full-duplex text communication link.

8. The method for providing Internet-based telephone call message translation as claimed in claim 7, wherein the full-duplex text communication link between at least the first party of the telephone call and the message translator comprises a real-time exchange of messages.

9. The method for providing Internet-based telephone call message translation as claimed in claim 1, wherein the message translator comprises a message translator terminal.

10. The method for providing Internet-based telephone call message translation as claimed in claim 1, wherein the message translator comprises an automated communications assistant.

11. The method for providing Internet-based telephone call message translation as claimed in claim 1, wherein messages are translated from text to speech and from speech to text.

12. A system for providing Internet-based telephone call message translation for translating messages between parties of a telephone call, the system comprising:
- a message translator for translating messages between a number of parties of a telephone call from text to speech and from speech to text, the message translator having communication capability over an Internet Protocol connection;
- at least one terminal device having communication capability over an Internet Protocol connection for use by at least a first party of the telephone call;
- a server having communication capability over an Internet Protocol connection for establishing a full-duplex text Internet Protocol connection to the terminal device and for establishing a full-duplex text Internet Protocol connection to the message translator; and
- a conference bridge coupled with the message translator to allow the first party to participate in a conference call via the full-duplex text Internet Protocol connections.

13. The system as claimed in claim 12, wherein the message translator further comprises at least one communication line interface for effecting a voice communication line connection between the message translator and at least a second party of the telephone call.

14. The system as claimed in claim 12, wherein the server further comprises a switching device for directing an incoming call to an available message translator.

15. The system as claimed in claim 12, wherein the server comprises a web server for establishing the full-duplex text Internet Protocol connections to the terminal device and to the message translator and a message server for administering communication of messages between the parties to a call and the message translator.

16. The system as claimed in claim 12, wherein the message translator comprises a message translator terminal.

17. The system as claimed in claim 12, wherein the message translator comprises an automated communications assistant.

18. A method for providing call center service, the method comprising the steps of:
- establishing a full-duplex text communication link between at least a first party and a call center via Internet Protocol;
- establishing a voice communication link between at least a second party and the call center; and
- establishing a communication link between a conference bridge and the call center, thereby allowing the first party to participate in a conference call via the full-duplex text communication link.

19. A method for providing call center service, the method comprising the steps of:
- providing a server having communication capability over Internet Protocol;
- providing at least one call center message translator having communication capability over Internet Protocol;
- providing a full-duplex text communication link through the server between at least a first party and the call center message translator via Internet Protocol; and
- providing a communication link between a conference bridge and the call center message translator, thereby allowing the first party to participate in a conference call via the full-duplex text communication link.

20. The method for providing call center service as claimed in claim 19, further comprising the step of:
- providing a voice communication link between at least a second party and the call center message translator.

21. A system for providing call center service, the system comprising:
- a call center message translator for providing services to at least a first party, the call center message translator having full-duplex text communication capability over Internet Protocol; and
- a conference bridge coupled with the call center message translator to allow the first party to participate in a conference call.

22. The system as claimed in claim 21, further comprising:
- a server having communication capability over Internet Protocol for establishing a full-duplex text Internet Protocol connection to a terminal device and for establishing a full-duplex text Internet Protocol connection to the call center message translator.

23. The system as claimed in claim 21, further comprising:
- at least one terminal device having full-duplex text communication capability over Internet Protocol for use by at least the first party; and
- a server having full-duplex text communication capability over Internet Protocol for establishing a full-duplex text Internet Protocol connection to the terminal device and for establishing a full-duplex text Internet Protocol connection to the call center message translator.

24. The system as claimed in claim 21, further comprising:
- at least one terminal device having full-duplex text communication capability over Internet Protocol for use by at least the first party.

* * * * *